UNITED STATES PATENT OFFICE.

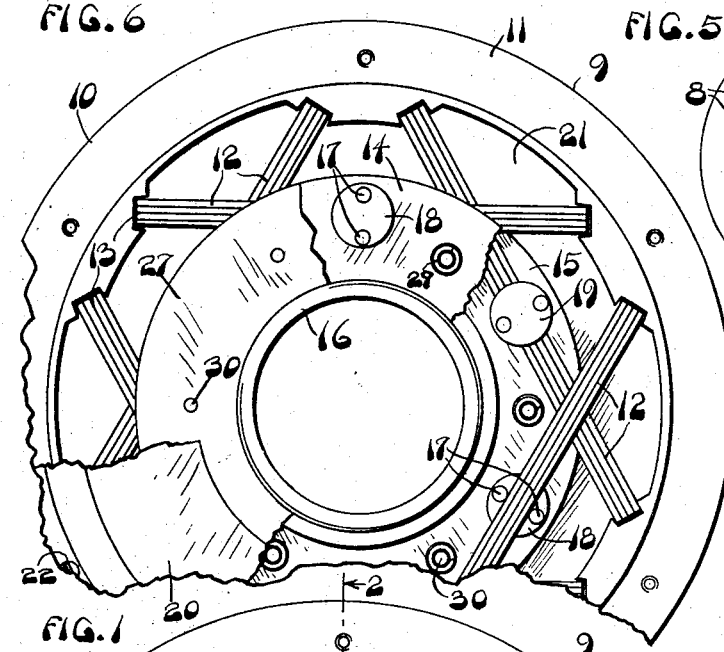
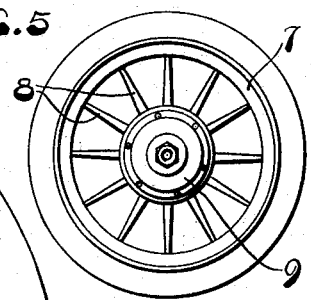
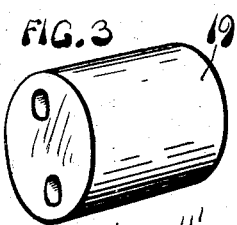
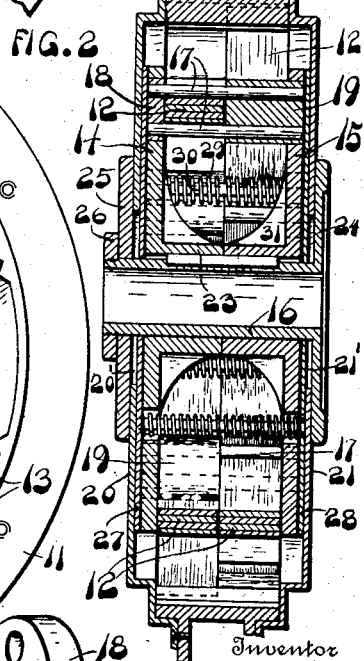
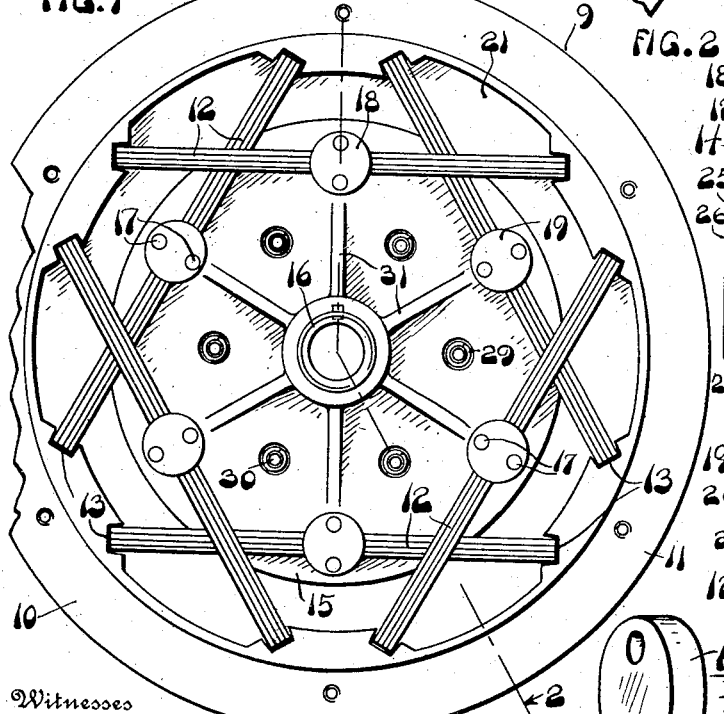
F. M. ROSS.
VEHICLE WHEEL.
APPLICATION FILED NOV. 17, 1913.
1,215,709. Patented Feb. 13, 1917.

FREDERICK M. ROSS, OF CINCINNATI, OHIO.

VEHICLE-WHEEL.

1,215,709.    Specification of Letters Patent.    Patented Feb. 13, 1917.

Application filed November 17, 1913. Serial No. 801,367.

*To all whom it may concern:*

Be it known that I, FREDERICK M. ROSS, a citizen of the United States of America, and resident of Cincinnati, county of Hamilton, and State of Ohio, have invented certain new and useful Improvements in Vehicle-Wheels, of which the following is a specification.

This invention relates to vehicle wheels, and particularly to that class of wheels which is used in automobile construction, and in which a yielding radial motion of the wheel is employed for relieving the vehicle of shocks and vibrations in passing over obstructions.

An object of my invention is to produce a wheel of this class, which has greater wearing qualities and is consequently stronger than any similar wheel known to me.

A further object is a wheel in which comparatively few parts are used, thereby producing a wheel of light weight and inexpensive construction.

These and other objects are attained in the wheel described in the following specification, and illustrated in the accompanying drawings, in which, Figure 1 is an elevation of the hub of a wheel embodying my invention, with parts removed to show the interior construction.

Fig. 2 is a sectional view taken on the line 2—2 of Fig. 1.

Figs. 3 and 4 are perspective views of details of my invention.

Fig. 5 is an elevation, upon a much reduced scale, of a wheel embodying my invention, as applied to a wheel of wood spoke construction.

Fig. 6 is a fragmental elevation of a hub, showing the construction as applied to an axle of large size.

The wheel illustrated as an embodiment of my invention comprises a felly 7, spokes 8, and a hub portion 9.

The hub comprises a rim 10, having annular flanges 11, 11', formed thereon for the reception of the ends of the spokes 8, a series of sets of springs 12, mounted in slots 13, formed in the inner wall of the rim, and two disks 14 and 15, suitably mounted upon a sleeve 16 and supported upon the springs, through the agency of pins 17, mounted in spools 18 and 19, which are mounted in the disks 14 and 15. Cover plates 20 and 21 are secured to the sides of the rim by means of screws 22, 22', disposed around the edges of the plates.

The springs 12 are located within the rim in six groups, which are so disposed in their mounting slots 13, that they present a hexagonal appearance, as shown in Fig. 1. Each group of springs is engaged on each side by one of the pins 17, so as to form six sets of two pins each. Each set is rotatably mounted at one end in a short spool 18 and similarly mounted at the other end in a long spool 19. The ends of the sets of pins which engage the three groups of springs lying against the disk 14, are mounted in short spools 18, located in openings formed near the periphery of the disk. The other ends of these pins are mounted in long spools 19, the outer ends of these spools being located in openings formed in this disk 15, while the inner end surfaces of the spool abut against the edges of the springs. The pins which engage the three sets of springs lying against the disk 15 are mounted in a similar manner, with the exception that the short spools in this case are mounted in disk 15 and the long spools are mounted in disk 14.

An inwardly projecting sleeve 23 is formed on each of the disks 14 and 15, the ends of the sleeves abutting and being keyed to the sleeve 16. This sleeve forms in effect the hub of the wheel, it being either rotatably mounted upon or keyed to the axle of the vehicle.

Since the disks 14 and 15 are yieldingly supported by the springs 12, the rim and cover plates of the wheel will have radial movement with relation to the sleeve 16; therefore enlarged circular openings 20', 21', are formed in the cover plates, to permit of such movement.

In order, however, to prevent dust or other foreign matter from entering the wheel, a flange 24 is provided on the inner end of the sleeve 16, to contact the cover plate 21, and a removable flange 25 is provided on the outer end of the sleeve, to contact cover plate 20. In order to maintain the flanges in contact with the cover plates, a nut 26 is screwed on to the threaded end of the sleeve and against the flange 25. Further protection of the inner parts of the wheel from the entrance of abrasive sand and other matter from the road, is afforded by a disk 27, located between the spool-carrying disk 14 and cover plate 20, and by another disk 28 located between the spool-carrying disk 15 and cover plate 21. These disks are mounted to have a sliding fit on the sleeve 16 and are maintained in yielding engagement with the cover plates 20 and 21, by means of a series of spiral springs 29. These springs pass freely through openings in the disks 14 and 15, and bear at their ends upon the disks 27 and 28. In order to prevent the springs from buckling under compression, and also to keep them in the same relative positions against the disks, pins 30 are secured to one of the disks 27 in positions to lie centrally of the openings in the disks 14 and 15, and to pass through the springs 29, as shown. The free ends of these pins may slidingly engage openings in the disk 28, if desired.

In order to protect the wheel against wear, the interior of the rim may be packed with grease or graphite or thick oil. This packing not only minimizes the wear, but also insures smooth and noiseless operation of the working parts.

In any position of the wheel, all of the springs 12 aid in supporting the weight of the vehicle, through the agency of the pins 17, which are strongly supported, because of their having bearings at each of their ends, in the disks.

It will be seen that the springs are deflected first in one direction and then in the other direction, as the wheel revolves, and that the ends of the springs must be free to move without binding in the slots 13; therefore, these slots are made wider at the top than at the bottom.

A feature to which I particularly desire to call attention, is the double bearing which I provide for the pins 17, by supporting them at each end with the springs 12, located between the points of support. The use of two supporting disks, external to the springs, enables me to increase the width of the springs 12 and to reduce their number, thus providing a strong construction with but few parts. This reduction in the number, as well as the increase in size of the working parts, is an improvement which increases the life of the wheel, as well as making it more substantial and less liable to transverse movement of the spring mounting rim with relation to the spool mounting disks, and the addition of ribs 31 to the disks 14 and 15 also strengthens the wheel materially against transverse or bending strains.

Having thus described my invention, what I claim is:

1. In combination in a wheel, a hub portion comprising a rim, disks surrounded by and spaced radially from the rim, two sets of springs located between the disks, one set contacting one disk and the other set contacting the other disk, spools mounted in the disks and having their ends contacting with the edges of the springs, and pins mounted in the spools and contacting with the faces of the springs.

2. A spring wheel comprising central disks, a rim surrounding and spaced from the disks, a plurality of sets of springs mounted at their ends on the rim and between the disks, spools rotatively mounted in the disks with their ends contacting the edges of the springs, pins rotatively mounted at their ends in the spools and engaging intermediate points of the faces of each set of springs.

In testimony whereof, I have hereunto subscribed my name this 14th day of November, 1913.

FREDERICK M. ROSS.

Witnesses:
OTTO HUBER,
WALTER F. MURRAY.

Copies of this patent may be obtained for five cents each, by addressing the "Commissioner of Patents, Washington, D. C."